United States Patent [19]

Tennant

[11] 4,015,843
[45] Apr. 5, 1977

[54] NEWSPAPER STREAMLINER

[76] Inventor: James R. Tennant, Rte. 3, Box 247, Haughton, La. 71037

[22] Filed: Oct. 14, 1975

[21] Appl. No.: 621,681

[52] U.S. Cl. .............................. 271/240; 271/237; 271/253; 226/19; 198/434; 198/411; 198/575
[51] Int. Cl.² .......................................... B65H 9/16
[58] Field of Search ... 271/237, 238, 240, 248–250, 271/253, 255, 34, 35, 264, 275; 198/29, 30, 283, 230, 411, 434, 575, 576; 226/17–19

[56] References Cited

UNITED STATES PATENTS

| | | | |
|---|---|---|---|
| 2,101,268 | 12/1937 | Novick | 271/253 |
| 2,212,006 | 8/1940 | Buchanan | 198/230 |
| 2,827,809 | 3/1958 | Beam | 226/19 |
| 3,297,147 | 1/1967 | Sackett, Sr. | 198/230 |
| 3,361,426 | 1/1968 | Pawlikowski et al. | 271/250 |
| 3,562,067 | 2/1971 | Kucheck | 271/240 |
| 3,595,369 | 7/1971 | Boulay et al. | 198/434 |
| 3,734,490 | 5/1973 | Parks | 271/34 |
| 3,901,381 | 8/1975 | Quinn | 198/283 |

OTHER PUBLICATIONS

Koning; "Envelope Aligning Device," IBM Technical Disclosure Bulletin, vol. 4, No. 12, p. 2; May 1962.

*Primary Examiner*—Robert W. Saifer
*Attorney, Agent, or Firm*—John M. Harrison

[57] ABSTRACT

A newspaper streamliner for mounting in a newspaper conveyor system which includes a pair of roller-operated belts disposed in essentially parallel relationship on each side of a newspaper stream, and a flat cover plate disposed between the belts to receive a continuing flow of newspapers. The belts are wider at the upstream, receiving end of the streamliner than at the discharge end in order to effect a straightening of the newspapers as they enter the wide end and are forced into alignment as they exit the narrow end of the moving belt. The streamliner is designed to be compatible with existing newspaper conveyor systems and can be mounted by means of an adjustable frame onto the frame of such a conveyor system, or in the alternative, on the floor or other area in the vicinity of the conveyor system.

9 Claims, 6 Drawing Figures

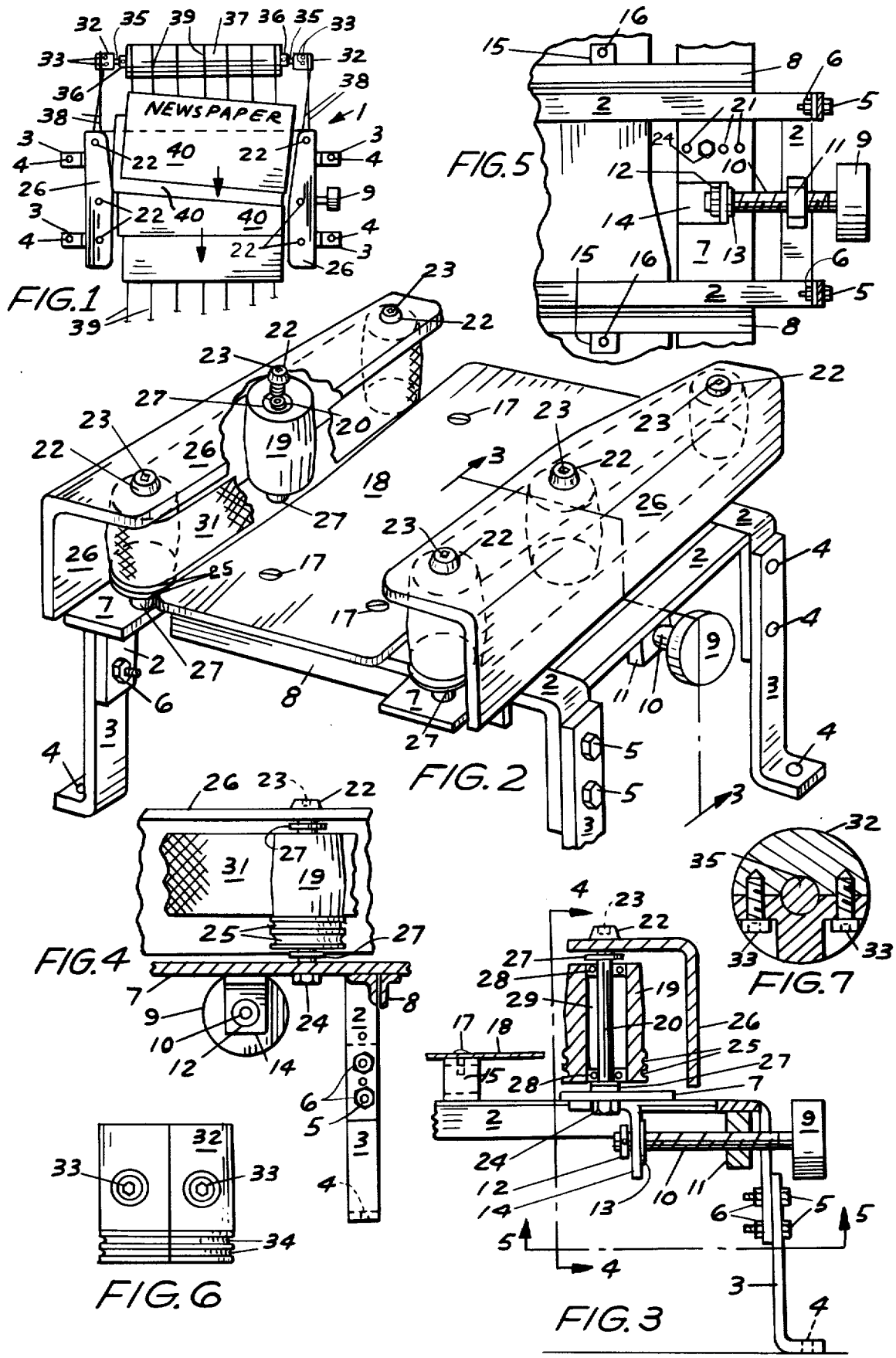

NEWSPAPER STREAMLINER

BACKGROUND OF THE INVENTION

1. Field of the Invention

This invention relates to the high speed movement of newspapers, and more particularly, to a newspaper streamliner which is designed to be compatible with high speed newspaper conveyor systems to insure that newspapers in the conveyor system remain in alignment during in-plant transportation after printing and prior to the stacking operation. The machine is capable of being quickly and easily installed in substantially any existing conveyor system, and is designed to be driven from the drive elements of the system. The device is adjustable, may be automated, and is designed to quickly, easily and efficiently maintain the alignment of a high speed stream of lapped newspapers in the conveyor system between the printing and the stacking operations or other segment of the newspaper conveyor transportation system.

2. Description of the Prior Art

Heretofore, various apparatus have been designed and used in order to maintain the alignment of a variety of materials in various manufacturing operations. Typical of such devices is the apparatus disclosed in the patent to R. E. J. Nordquist, et al., U.S. Pat. No. 2,488,551. This device is designed to guage and feed metal sheets in order to accurately position the sheets for additional treatment. The metal sheets are initially advanced along a straight line path between side guages until they reach a predetermined point, at which point they are caused to stop and are then in position to be further processed. The F. Ungerer disclosure, U.S. Pat. No. 2,857,158, discloses a "Guiding Means For Moving Sheet-Metal Bands", which apparatus is designed to feed sheet metal bands through a pair of conveyor chains which grip the bands and cause them to move therebetween. A similar apparatus designed specifically for the newspaper production and transportation problem, is the F. F. Pawlikowski patent, U.S. Pat. No. 3,361,426, which mechanism "jogs" the folded papers as they pass a predetermined point to aid in alignment.

Conventional methods of maintaining the alignment of a stream of rapidly moving newspaper such as jogging, are subject to many disadvantages. For example, in the F. F. Pawlikowski patent, the apparatus is designed to oscillate from side to side as a stream of newspapers passes through the device. The mechanism is cam actuated, and a major problem is presented by the machine movement, since the newspapers are alternately bent and then are allowed to straighten suddenly as the cam operates, the sudden straightening frequently causing the newspapers to again bounce out of alignment. This problem is intensified at high newspaper speeds since the oscillating action on a particular segment or band of newspapers crossing the device at any particular point in time has a tendency to disturb the alignment of that particular band with respect to adjacent papers in both the downstream and the upstream supply. Since these papers are overlapped approximately 3 to 4 inches, such disturbances can cause a jam in the conveyor system with accompanying down-time and loss of operation efficiency. Furthermore, contact between the edges of the rapidly moving stream causes a drag on the newspapers, thereby again tending to cause misalignment of the papers.

The basic problem of newspaper misalignment during the course of conveying the papers between the printing and stacking operations as well as in other areas of the transportation system, is responsible for a considerable delay in the newspaper delivery system. This is true since the misalignment frequently causes the conveyors to jam, thereby necessitating stopping the conveyors and clearing the jam before the conveyor can be operated again. This problem is intensified by a necessarily irregular conveyor path, since the conveyor system generally must traverse not only a significant horizontal distance, but also vertical distances, generally between floors of the plant, and therefore, must usually make several horizontal and vertical turns during the course of travel. The advent of high speed printing has led to a need for a cooperating rapid delivery system which is characterized by high efficiency, a characteristic which is closely tied to proper alignment of newspapers in the conveyor system. Consequently, close tolerance in lap and alignment of the newspapers under circumstances of travel at a high rate of speed is essential, and much time and attention has been devoted to the problem of maintaining proper alignment of newspapers as they move in the conveyor system at varying speed.

Accordingly, it is an object of this invention to provide a new and improved newspaper streamliner which is simple and easy to operate and which is compatible with substantially any newspaper conveyor system presently in existence.

Yet another object of this invention is to provide a new and improved newspaper streamliner and straightening apparatus which is characterized by simplicity of operation and high reliability in maintaining the alignment of a stream of newspapers moving at high, low and intermediate speeds.

Yet another object of this invention is to provide an apparatus for straightening a stream of newspapers which apparatus is designed to momentarily contact the newspapers by means of a pair of moving belts in such a manner as to disturb only the misaligned newspapers, bringing them back into alignment, but which will not disturb the properly aligned newspapers.

A still further object of the invention is to provide a new and improved newspaper streamlining and straightening apparatus which is designed to maintain a stream of moving newspapers in proper alignment without bending or causing misalignment of the newspapers in the course of travel, even at high speed.

A still further object of the invention is to provide a newspaper streamliner which utilizes a pair of moving belts to effect alignment of misaligned newspapers, which belts are caused to move at essentially the same linear speed as the newspapers in order to effect efficient alignment of the stream at substantially any speed of travel.

Yet another object of the invention is to provide a device for continually straightening a stream of rapidly moving, lapped newspapers in a conveyor system for disposing a pair of moving belts on both sides of and contacting the edges of the stream and moving at essentially the same linear speed of the newspapers, which belts are adjustable and may be automatically or manually disposed at right angles to the path of the stream to adjust the position of the newspaper stream in the conveyor system.

SUMMARY OF THE INVENTION

These and other objects of the invention are provided in a newspaper streamliner which includes the following elements:

1. A frame adapted for mounting in an existing newspaper conveyor system;
2. Two sets of vertically oriented rollers disposed in essentially parallel, aligned relationship on the frame on opposite sides of the conveyor system;
3. A pair of endless belts, each of which are mounted on one set of rollers and are driven by the conveyor system in the direction of the newspaper travel; and
4. A cover plate disposed between the endless belts and designed to receive the newspaper stream and to aid in maintaining both newspaper alignment and lap in the stream.

BRIEF DESCRIPTION OF THE DRAWINGS

The invention will be better understood in view of the following description presented with reference to the accompanying drawing.

FIG. 1 of the drawing is a top elevation of the newspaper streamliner of this invention, illustrating the correcting alignment of several misaligned newspapers;

FIG. 2 is a perspective view of the newspaper streamliner illustrated in FIG. 1;

FIG. 3 is a sectional view taken along lines 3—3 in FIG. 2 of one bank of rollers and the lateral adjusting mechanism of the newspaper streamliner illustrated in FIGS. 1 and 2;

FIG. 4 is a sectional view taken along lines 4—4 in FIG. 3 further illustrating the mounting of a typical roller and endless belt on the carriage plate of the newspaper streamliner illustrated in FIGS. 1–3;

FIG. 5 is a bottom elevation, partially in section, taken along lines 5—5 in FIG. 3, further illustrating the adjusting mechanism and cover plate of the streamliner illustrated in FIGS. 1–4;

FIG. 6 is a front elevation of a typical drive pulley for driving the newspaper streamliner of this invention; and FIG. 7 is a top sectional view of the drive pulley illustrated in FIG. 6, more particularly illustrating a preferred split-pulley construction of the drive pulley.

DESCRIPTION OF THE PREFERRED EMBODIMENTS

Referring now to FIG. 1 of the drawing, the newspaper streamliner of this invention, generally illustrated by reference numeral 1 is shown with a misaligned stream of newspapers 40 moving in the direction of the arrow through the device. Newspapers 40 rest on and are carried by carrier cables 39, which are a part of the conveyor system of a typical conventional newspaper transportation system used in newspaper production plants.

Referring now to FIG. 2 of the drawing, newspaper streamliner 1 is constructed of frame 2, to which is attached four mounting brackets 3 equipped with mounting bracket apertures 4, through which mounting bracket bolts 5 may be inserted and tightened by means of mounting bracket nuts 6. Mounting brackets 3 may then be used to position newspaper streamliner 1 in a conventional newspaper conveyor system by mounting the streamliner to the floor. In the alternative, suitable adapters may be mounted to frame 2 and/or mounting brackets 3, to make newspaper streamliner 1 compatible with the frame system of an existing newspaper conveyor system. Carriage plates 7 are disposed in movable, essentially parallel relationship on frame 2, and are maintained in this relationship by means of carriage guides 8 positioned at the front and rear of newspaper streamliner 1, both of which are disposed adjacent frame 2. Adjusting wheel 9, carried by adjusting wheel stem 10 which is threaded to cooperate with threaded adjusting wheel mount 11, serves to provide a means for shifting carriage plates 7 and carriage guides 8 laterally back and forth with respect to frame 2, as desired. Referring to FIG. 3 of the drawing, this shifting adjustment is made possible by cooperation between adjusting wheel stem 10 and carriage plate bracket 14 which is attached to carriage plate 7. Adjusting wheel stop 12 and adjusting wheel collar 13 serve to securely, but rotatably, mount adjusting wheel stem 10 onto carriage plate bracket 14. Accordingly, when adjusting wheel 9 is turned in a clockwise direction, carriage plate 7 is constrained to move to the left, and when adjusting wheel 9 is turned in a counterclockwise direction, carriage plate 7 moves back in the right hand direction.

Referring now to FIGS. 2 and 3 of the drawing, a series of three belt rollers 19 are mounted by means of belt roller shafts 20 to each of the two carriage plates 7. Rollers 19 are each equipped with two bearings 28 at the top and bottom thereof, which bearings are fitted inside the cavity 29 of each roller and on each belt roller shaft 20. As more particularly illustrated in FIG. 5 of the drawing, belt roller shafts 20 are adapted to register with belt roller shaft apertures 21, several of which are provided in order to permit lateral adjustment of belt rollers 19 on carriage plate 7 to facilitate the straightening of newspapers having a variety of widths. Belt rollers 19 are secured on belt roller shaft 20 by means of belt roller button head cap screws 22 which are fitted with a "hex" drive 23, as illustrated, and hex head cap screws 24. Cap screws of other design may be used as desired, but button head cap screws 22 or the equivalent in round head cap screws, are preferably used to secure the tops of belt roller shafts 20, for safety purposes. As further illustrated in FIG. 4 of the drawing, belt roller washers 27 are preferably positioned between the bottom of each belt roller 19 and the top of carriage plate 7, and between the top of each roller and belt roller cover 26, to permit more freedom of rotation of belt roller 19.

As illustrated in FIGS. 3 and 4 of the drawing, belt rollers 19 are fitted with belt roller grooves 25 in order to facilitate driving of the rollers by a cable drive system. Furthermore, belt roller cover 26 is disposed over the sides and top of both roller systems in order to minimize the danger of having loose clothing caught in rotating belt rollers 19 and endless belts 31. Belt rollers 19 are disposed in essentially aligned relationship except for the top or rear rollers, as illustrated in FIGS. 1 and 2. These two belt rollers 19 are positioned slightly to the outside of the centers of rotation of the remaining rollers in each bank in order to permit a wider inlet area to receive the newspapers 40 and initiate the aligning operation.

Referring again to FIGS. 2–4, it will be appreciated that an endless belt 31 is disposed on each of the three sets of belt rollers 19 and is constrained to rotate at the same speed as belt rollers 19. Endless belts 31 are also constrained to remain precisely positioned on belt rollers 19 because of the double taper construction of belt rollers 19, which prevents the belt from sliding upward or downward as the rollers rotate. Referring again to FIG. 1 of the drawing, the right hand bank of belt rollers 19 is constrained to rotate in a counterclockwise direction, while the left hand bank rotates in a clockwise direction in order to properly align the stream of newspapers 40 moving from top to bottom in the direction of the arrow, as indicated. Since it has been found that endless belts 31 must rotate at substantially the same speed as carrier cables 39 in order to properly maintain alignment of the newspaper stream, particularly at high conveyor speeds, the driving of belt rollers 19 is achieved by means of drive pulleys 32, which are preferably of split construction. As illustrated in FIGS. 1, 6 and 7 of the drawing, the split halves of drive pulleys 32 are preferably joined by means of drive pulley bolts 33 which cooperate with threads provided in a receiving half of drive pulleys 32, and are tightened over drive pulley shaft 35 by tightening these bolts. Drive pulleys 32 are preferably positioned on both ends of drive pulley shaft 35, which also carries drive pulley drum 37, an element in the newspaper conveyor system itself. Suitable spacing is maintained between drive pulleys 32 and drive pulley drum 37 by means of drive pulley collars 36 positioned on drive pulley shaft 35 adjacent drive pulley drum 37. As in the case of belt rollers 19, drive pulleys 32 are equipped with a pair of drive pulley grooves 34 for attaching dual drive cables 38, which drive cables cooperate between drive pulleys 32 and at least one belt roller 19 in each bank of belt rollers mounted in newspaper streamliner 1. The desired direction of rotation of belt rollers 19 and endless belts 31 can be effected by reversing the position of drive cables 38 in drive pulley grooves 34.

In order to insure that the stream of newspapers passing between belt rollers 19 and cooperating endless belts 31 maintain a proper elevation in the conveyor system, cover plate 18 is disposed between the belts and immediately beneath carrier cables 39. For example, referring again to FIGS. 3 and 5 of the drawing, cover plate 18 may typically be mounted on carriage guide brackets 15 by means of carriage guide bracket apertures 16 and carriage guide bracket screws 17. Mounting cover plate 18 in a removable fashion in this manner permits the cover plate to be removed at will, and permits convenience in performance of maintenance. Carriage guide bracket 15 may typically be welded to frame 2, as illustrated.

It will be appreciated that while the respective banks of belt rollers 19 and the pair of endless belts 31 may be shifted laterally to compensate for adjustments in a stream of newspapers in the conveyor system without the use of automation, a motor may be easily utilized in cooperation with adjusting wheel stem 10 or adjusting wheel 9. For example, a worker monitoring the stacking system at the termination point of the conveyor system may be provided access to controls which activate a motor mounted on the newspaper streamliner of this invention, and may therefore be able to adjust the conveyor stream coming into the stacking point by simply manipulating the controls which control the lateral carriage movement of the streamliner. In the alternative, the conveyor stream can simply be controlled by manual manipulation of adjusting wheel 9 in the proper direction, as heretofore noted. If a motor is utilized in cooperation with the streamliner, it is preferred to use a gear head motor or the equivalent, in order to effect a slow, smooth lateral movement of belt rollers 19 and endless belts 31 to avoid abruptly disturbing the newspaper stream. It has been found that a gear head motor having a gear ratio of about 52:1 is acceptable in effecting a lateral change in the position of endless belts 31.

It will be further appreciated that there are many different production sizes of newspapers produced in this country and abroad, and consequently, a need exists for a technique to adjust the width of belt rollers 19, and hence endless belts 31 to compensate for such differences. Accordingly, referring again to FIG. 5 of the drawing, as heretofore noted, belt roller shaft apertures 21 are provided in order to compensate for newspapers which are, for example, 58 inches to 60 inches wide. Thus, such compensation can easily be made by simply loosening button head cap screws 22, and hex head cap screws 24, removing belt roller shafts 20, and selecting the appropriate belt roller shaft apertures 21 for reinsertion of belt roller shafts 20 and relocation of belt rollers 19 and endless belts 31 in the appropriate position.

As heretofore noted, belt rollers 19 are constrained to operate at the same rotational speed as drive pulley drum 37 which is driven at the conveyor speed. Accordingly, endless belts 31 are necessarily moving at the same speed or substantially the same speed as the newspaper stream in order to maximize the straightening effect of the apparatus. Furthermore, the driving action between drive pulley 32 and belt rollers 19 is preferably achieved with a dual set of drive cables 38 to facilitate continued operation of the conveyor system in the event one drive cable should break. It will also be appreciated that while it is preferred to drive a single set of belt rollers 19 located closest to drive pulleys 32, all of the belt rollers 19 are equipped with belt roller grooves 25, and they may be all driven if deemed necessary.

Having described my invention with the particularity set forth above, what is claimed is:

1. A newspaper streamliner for maintaining the alignment of newspapers in a newspaper conveyor system comprising:
    a. a frame positioned in said conveyor system;
    b. a first and second set of vertically oriented, essentially aligned rollers disposed in essentially parallel relationship on said frame on either side of the conveyor in said conveyor system;
    c. a first endless belt mounted on said first set of vertically oriented rollers and a second endless belt mounted on said second set of vertically oriented rollers; and
    d. a set of drive pulleys mounted in cooperation with said conveyor system and rotating at essentially the same pheripheral speed as the conveyor system, and at least one set of drive cables removably cooperating with said drive pulleys and at least one roller in each of said first and second set of vertically oriented rollers to drive said vertically oriented rollers and said endless belts.

2. The newspaper streamliner of claim 1 wherein the forward rollers in each of said first and second set of vertically oriented rollers are positioned farther apart from each other than the others of said vertically oriented rollers to receive said newspaper.

3. The newspaper streamliner of claim 1 further comprising a carriage slidably carried by said frame and receiving said first and second set of vertically oriented rollers in adjustable relationship.

4. The newspaper streamliner of claim 1 wherein the forward rollers in each of said first and second set of vertically oriented rollers are positioned farther apart from each other than the others of said vertically oriented rollers and further comprising a carriage slidably carried by said frame and receiving said first and second set of vertically oriented rollers in adjustable relationship.

5. The newspaper streamliner of claim 1 wherein at least one of said rollers in each of said first and second set of vertically oriented rollers is provided with a set of grooves to receive said cables and further comprising a cover plate carried by said frame and disposed under said conveyor to limit the vertical displacement of said newspapers with respect to said first endless belt and said second endless belt.

6. The newspaper streamliner of claim 1 wherein said vertically oriented rollers are double tapered to prevent said endless belt from moving upward or downward on said rollers when said rollers are rotating.

7. The newspaper streamliner of claim 1 further comprising;
   a. a carriage slidably carried by said frame and receiving said first and second set of vertically oriented rollers in adjustable relationship; and
   b. adjusting means cooperating with said carriage and said frame to selectively move said vertically oriented rollers and said endless belts in concert in a direction perpendicular to the direction of movement of said conveyor.

8. The newspaper streamliner of claim 1 wherein said drive pulleys are split pulleys bolted to a drum shaft of said conveyor system and having a pair of grooves to receive a pair of drive cables.

9. The newspaper streamliner of claim 1 further comprising
   a carriage slidably carried by said frame and receiving said first and second set of vertically oriented rollers in adjustable relationship, and
   adjusting means cooperating with said carriage and said frame to selectively move said carriage, said vertically oriented rollers and said endless belts in concert in a direction perpendicular to the direction of movement of said conveyor; and
wherein:
   a. the forward rollers in each of said first and second set of vertically oriented rollers are positioned farther apart from each other than the others of said vertically oriented rollers;
   b. at least one of said rollers in each of said first and second set of vertically oriented rollers is provided with a set of grooves to receive a drive cable;
   c. said vertically oriented rollers are double tapered to prevent said endless belts from moving upward or downward on said rollers when said rollers are rotating; and
   d. said drive pulleys are split pulleys bolted to a drum shaft of said conveyor system and having a pair of grooves to receive a pair of drive cables.

* * * * *